(12) United States Patent
Septiana et al.

(10) Patent No.: US 12,437,373 B2
(45) Date of Patent: Oct. 7, 2025

(54) DETERMINATION METHOD, NON-TRANSITORY COMPUTER-READABLE RECORDING MEDIUM STORING DETERMINATION PROGRAM, AND INFORMATION PROCESSING DEVICE

(71) Applicant: FUJITSU LIMITED, Kawasaki (JP)

(72) Inventors: Lina Septiana, Machida (JP); Tomoaki Matsunami, Kawasaki (JP); Narishige Abe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 362 days.

(21) Appl. No.: 18/323,718

(22) Filed: May 25, 2023

(65) Prior Publication Data

US 2023/0298140 A1 Sep. 21, 2023

Related U.S. Application Data

(63) Continuation of application No. PCT/JP2021/002736, filed on Jan. 27, 2021.

(51) Int. Cl.
*G06T 7/00* (2017.01)
*G06T 5/70* (2024.01)
(Continued)

(52) U.S. Cl.
CPC ...... *G06T 5/70* (2024.01); *G06T 2207/20224* (2013.01); *G06T 2207/30201* (2013.01)

(58) Field of Classification Search
CPC ............. G06T 5/70; G06T 2207/20224; G06T 2207/30201; G06T 7/00; G06V 10/30;
(Continued)

(56) References Cited

U.S. PATENT DOCUMENTS 10,762,337 B2 * 9/2020 Sharma ................ G06V 40/172
2017/0084007 A1 * 3/2017 Rakhshanfar ............ G06T 5/20
(Continued)

FOREIGN PATENT DOCUMENTS

JP 2015-503866 A 2/2015
JP 2019-096130 A 6/2019
(Continued)

OTHER PUBLICATIONS

Sushma Venkatesh, Raghavendra Ramachandra, Kiran Raja, Luuk Spreeuwers, Raymond Veldhuis, Christoph Busch; Proceedings of the IEEE/CVF Winter Conference on Applications of Computer Vision (WACV), 2020, pp. 280-289 (Year: 2020).*

(Continued)

*Primary Examiner* — Gregory A Morse
*Assistant Examiner* — Ronde Lee Miller
(74) *Attorney, Agent, or Firm* — Fujitsu Intellectual Property Center

(57) ABSTRACT

In a determination method, a computer executes processing including: generating face image data from which noise is removed by a specific algorithm from face image data when the face image data is acquired; generating difference image data concerning difference between the face image data that has been acquired and the face image data that has been generated; determining whether or not the face image data that has been acquired is a composite image based on information included in the difference image data; and determining whether or not the face image data that has been acquired is a composite image based on information included in frequency data generated from the difference image data in a case where the face image data that has been acquired is not determined to be a composite image.

21 Claims, 7 Drawing Sheets

(51) Int. Cl.
    *G06V 10/30*     (2022.01)
    *G06V 10/42*     (2022.01)
    *G06V 10/82*     (2022.01)
    *G06V 20/00*     (2022.01)
    *G06V 40/16*     (2022.01)

(58) Field of Classification Search
    CPC .... G06V 10/431; G06V 20/95; G06V 40/172; G06V 10/82
    See application file for complete search history.

(56) References Cited

U.S. PATENT DOCUMENTS

| | | | |
|---|---|---|---|
| 2020/0218885 | A1 | 7/2020 | Darmstadt |
| 2020/0364834 | A1* | 11/2020 | Ferrés ................... G06T 5/60 |
| 2021/0097297 | A1* | 4/2021 | Ren ....................... G06N 3/047 |
| 2022/0207260 | A1* | 6/2022 | Dong .................... G06V 40/172 |
| 2025/0157253 | A1* | 5/2025 | Islam .................... G06V 10/30 |

FOREIGN PATENT DOCUMENTS

| | | |
|---|---|---|
| JP | 2020-525947 A | 8/2020 |
| WO | 2013/100898 A1 | 7/2013 |
| WO | 2019/002602 A1 | 1/2019 |

OTHER PUBLICATIONS

U. Scherhag, L. Debiasi, C. Rathgeb, C. Busch and A. Uhl, "Detection of Face Morphing Attacks Based on PRNU Analysis," in IEEE Transactions on Biometrics, Behavior, and Identity Science, vol. 1, No. 4, pp. 302-317, Oct. 2019, doi: 10.1109/TBIOM.2019.2942395 (Year: 2019).*

Tom Neubert, Christian Kraetzer, and Jana Dittmann. 2019. A Face Morphing Detection Concept with a Frequency and a Spatial Domain Feature Space for Images on eMRTD . In ACM Information Hiding and Multimedia Security Workshop (Year: 2019).*

S. Venkatesh, R. Ramachandra, K. Raja, L. Spreeuwers, R. Veldhuis and C. Busch, "Morphed Face Detection Based on Deep Color Residual Noise," 2019 Ninth International Conference on Image Processing Theory, Tools and Applications (IPTA), Istanbul, Turkey, 2019, pp. 1-6, doi: 10.1109/IPTA.2019.8936088. (Year: 2019).*

Pikoulis, E.-V., Ioannou, Z.-M., Paschou, M., & Sakkopoulos, E. (2021). Face Morphing, a Modern Threat to Border Security: Recent Advances and Open Challenges. Applied Sciences, 11(7), 3207. https://doi.org/10.3390/app11073207 (Year: 2021).*

Sharafudeen, M., Chandra S S, V. Frequency forensics for deep fake face detection using dual residual networks. Multimed Tools Appl (2025). https://doi.org/10.1007/s11042-025-20897-w (Year: 2025).*

Christian Rathgeb et al., "PRNU-based detection of facial retouching", IET Biometrics, IEEE, Michael Faraday House, Six Hills Way, Stevenage, HERTS.SG1 2AY, UK, vol. 9, No. 4, XP006090764, pp. 154-164, Jul. 1, 2020. Cited in Extended European Search Report (EESR) mailed on Dec. 8, 2023 for corresponding European Patent Application No. 21922784.0.

Sushma Venkatesh et al., "Face Morphing Attack Generation & Detection: A Comprehensive Survey", arxiv.org, Cornell University Library, 201 Olin Library Cornell University Ithaca, NY 14853, XP081807368, 18 pages, Nov. 3, 2020. Cited in Extended European Search Report (EESR) mailed on Dec. 8, 2023 for corresponding European Patent Application No. 21922784.0.

EESR—Extended European Search Report mailed on Dec. 8, 2023 for corresponding European Patent Application No. 21922784.0 (4 pages).

Xinrui Yu et al., "Face Morphing Detection using Generative Adversarial Networks", 2019 IEEE International Conference on Electro Information Technology(EIT), pp. 288-291, May 22, 2019 (Total 4 pages) (Cited in ISR).

International Search Report and Written Opinion of the International Searching Authority (Form PCT/ISA/210, 220, and 237), mailed in connection with PCT/JP2021/002736 and mailed Apr. 13, 2021 (Total 10 pages).

* cited by examiner

SOURCE IMAGE

MORPHING IMAGE

TARGET IMAGE

FIG. 6

| TEACHER DATA NO. | IDENTIFIER |
|---|---|
| 1 | bonafide |
| 2 | bonafide |
| 3 | bonafide |
| 4 | bonafide |
| ... | ... |
| 101 | morfing |
| 102 | morfing |
| 103 | morfing |
| ... | ... |

DETERMINATION METHOD, NON-TRANSITORY COMPUTER-READABLE RECORDING MEDIUM STORING DETERMINATION PROGRAM, AND INFORMATION PROCESSING DEVICE

CROSS-REFERENCE TO RELATED APPLICATION

This application is a continuation application of International Application PCT/JP2021/002736 filed on Jan. 27, 2021 and designated the U.S., the entire contents of which are incorporated herein by reference.

FIELD

This case discussed herein is related to a determination method, a non-transitory computer-readable recording medium storing a determination program, and an information processing device.

BACKGROUND

In face authentication, a fraudulent act called a morphing attack is sometimes performed. Therefore, a technique to determine whether or not face image data is a morphing image has been disclosed (see, for example, Patent Document 1).

Examples of the related art include [Patent Document 1] Japanese National Publication of International Patent Application No. 2020-525947.

SUMMARY

According to an aspect of the embodiments, there is provided a determination method implemented by a computer, the determination method including: generating face image data from which noise is removed by a specific algorithm from face image data when the face image data is acquired; generating difference image data concerning difference between the face image data that has been acquired and the face image data that has been generated; determining whether the face image data that has been acquired is a composite image based on information included in the difference image data; and determining whether the face image data that has been acquired is a composite image based on information included in frequency data generated from the difference image data in a case where the face image data that has been acquired is not determined to be a composite image.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a diagram that exemplifies teacher data; and

DESCRIPTION OF EMBODIMENTS

However, sufficient determination accuracy may not be obtained in determining whether or not the face image data is a morphing image.

In one aspect, an object of the present disclosure is to provide a determination method, a determination program, and an information processing device capable of improving determination accuracy of determining whether or not face image data is a morphing image.

Face authentication is a technique to perform identity verification by using a face feature. In the face authentication, identity verification is performed by comparing (collating) collation face feature data acquired by a sensor with registered face feature data registered in advance in a situation where verification is needed, and determining whether or not similarity is equal to or higher than an identity verification threshold value. The face authentication is used in passport registration places, ID card registration places, entrance/exit management, and the like.

Figure 1:
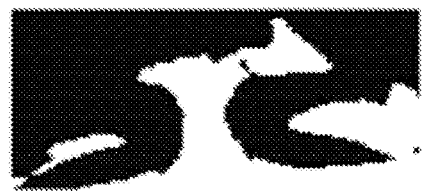
FIG. 1 is a diagram that exemplifies a morphing image.
Figure 1:
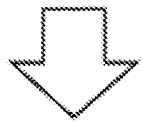
Figure 1:
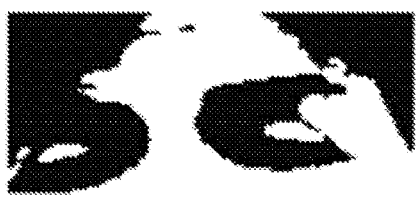
Figure 1:
Figure 1:
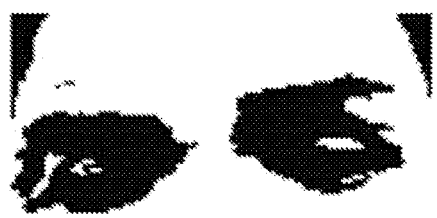
Figure 1:

In the face authentication, a fraudulent act called a morphing attack is sometimes performed. In a morphing attack, as exemplified in FIG. 1, a source image of a first person and a target image of a second person are combined by a morphing technique to generate a composite image. This composite image is referred to as a morphing image. The source image of the first person is not a face image to which correction or the like has been applied, but an actual face image of the first person. The target image of the second person is not a face image to which correction or the like has been applied, but an actual face image of the second person.

The morphing image includes a fusion image (so-called cut-and-paste image) obtained by partially combining two face images. The cut-and-paste image is, for example, an image obtained by cutting out an eye portion and a mouth portion and replacing them with those of another person.

The morphing image includes an interpolation image obtained by interpolating two face images. The interpolation image is an image obtained by applying interpolation to two face images. For example, the interpolation image is obtained by averaging two face images.

The morphing image has both a face feature of the first person and a face feature of the second person. Therefore, when the morphing image is registered as the registered face feature data, there is a possibility that both the first person and the second person are successfully identified in identity verification. For example, if the morphing image in which the face image data (source image) of the first person and the face image data (target image) of the second person are combined is registered at the time of creating a passport, both the first person and the second person can use the issued one passport.

Here, a method to detect the morphing attack will be examined. For example, a technique that uses pattern noise (PRNU: Photo Response Non-Uniformity) of an image sensor can be considered. Specifically, it is considered to use energy characteristics of spatial features and spectral features extracted from PRNU patterns across image cells. However, since this method needs a special sensor, it is costly and processing becomes complicated.

Next, a technique that uses residual noise based on deep learning is considered. Specifically, it is a technique that determines whether or not face image data, which is a target, is a morphing image by using residual noise obtained by obtaining a difference between the face image data and the face image data after noise removal. However, in the technique that uses the residual noise, since only spatial domain information is used, there is a possibility that determination can be made only for a specific type of morphing image.

Therefore, in the following embodiment, an information processing device, a determination method, and a determination program that can improve determination accuracy of a morphing image while suppressing cost will be described.

First Embodiment

First, the principle of the present embodiment will be described.

As described above, the morphing image includes an interpolation image, a cut-and-paste image, and the like. These are combined from pieces of face image data of a plurality of different persons. Each piece of face image data is acquired by, for example, a different camera. In this case, noise with a different intensity remains in each piece of face image data. Even if each piece of face image data is acquired by the same camera, noise with a different intensity still remains in each piece of face image data because timing, environment, and the like at and in which the face image data is acquired are different.

Therefore, difference image data concerning difference between the morphing image and the morphing image subjected to noise removal processing is acquired. A removed noise component remains in this difference image data. Therefore, the difference image data represents the residual noise. Since noise having different intensities remains in the residual noise, discontinuous noise intensity appears. Therefore, signal abnormality caused by morphing processing can be detected.

For example, in the cut-and-paste image, a trace of direct operation on a pixel remains in the image plane. Therefore, by analyzing spatial domain information in a case where the residual noise is represented by a predetermined spatial domain, it is possible to detect the edge of each portion cut and pasted in the cut-and-paste image.

However, it is difficult to determine whether or not the interpolation image, which does not have the edges in the cut-and-paste image, is a morphing image even if the spatial domain information is analyzed.

For this interpolation image, a pattern that is difficult to appear in the spatial domain information may appear in frequency domain. For example, other traces of manipulation such as peaks and lines that do not appear in the spatial domain information may appear in the frequency domain represented by the logarithmic amplitude scale. Therefore, by analyzing this frequency domain information and detecting the signal abnormality caused by the morphing processing, the determination accuracy of determining whether or not the face image data, which is a target, is the morphing image is improved.

Figure 2A:
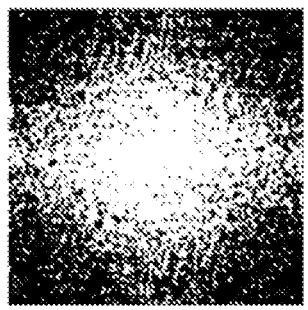
FIGS. 2A to 2I are diagrams that explain the principle of an embodiment.

FIG. 2A is a diagram that exemplifies actual face image data of the first person. FIG. 2B is a diagram that exemplifies actual face image data of the second person. No trace of the morphing processing remains in the residual noise of the face image data. Therefore, as exemplified in FIG. 2C, even if the residual noise is converted into the frequency space, the signal abnormality caused by the morphing processing does not appear as a feature.

Figure 2D:
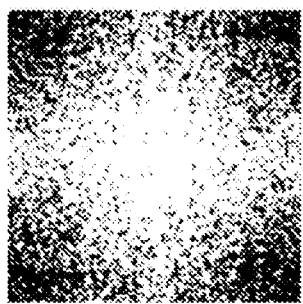

FIG. 2D is a diagram that exemplifies a cut-and-paste image in which face image data of the first person and face image data of the second person are partially combined. FIG. 2E illustrates spatial domain information in a case where the residual noise of the cut-and-paste image is represented by a predetermined spatial domain. In this spatial domain information, it is possible to easily detect an edge of each cut and pasted portion as signal abnormality. FIG. 2F is a diagram that exemplifies frequency domain information in a case where residual noise of a cut-and-paste image is converted into a frequency space. As exemplified in FIG. 2F, a feature such as a vertical line passing through the center is more likely to appear as the signal abnormality than in the case of FIG. 2C.

Figure 2G:
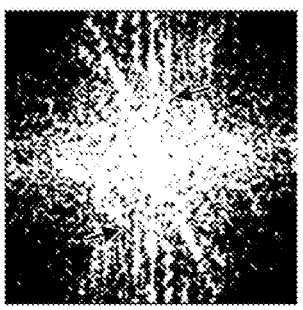
Figure 2B:
Figure 2E:
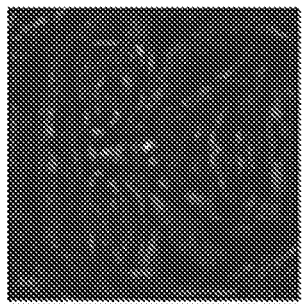
Figure 2H:
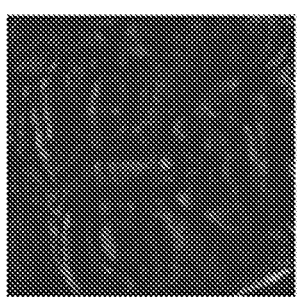
Figure 2C:
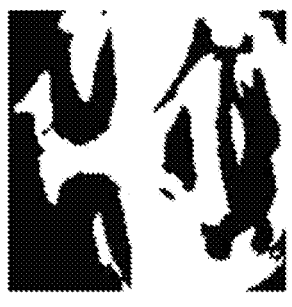
Figure 2F:
Figure 2I:
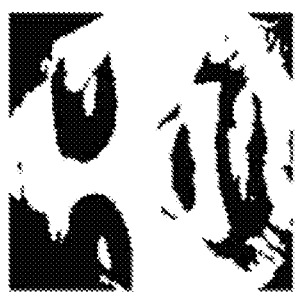

FIG. 2G is a diagram that exemplifies an interpolation image obtained by averaging the face image data of the first person and the face image data of the second person. FIG. 2H illustrates spatial domain information in a case where the residual noise of the interpolation image is represented by a predetermined spatial domain. Since the interpolation image does not include an edge, a feature of the signal abnormality is less likely to appear in the spatial domain information. FIG. 2I is a diagram that exemplifies frequency domain information in a case where the residual noise of the interpolation image is converted into a frequency space. As exemplified by arrows in FIG. 2I, peaks, lines, and the like that do not appear in the spatial domain information appear as features of the signal abnormality.

As described above, even if the face image data, which is a target, is not determined to be the morphing image in the spatial domain information, the determination accuracy of the morphing image is improved by performing redetermination in the frequency domain information. In addition, since it is not needed to add a special device or the like, the cost can be suppressed.

Hereinafter, the present embodiment will be described specifically.

Figure 3A:
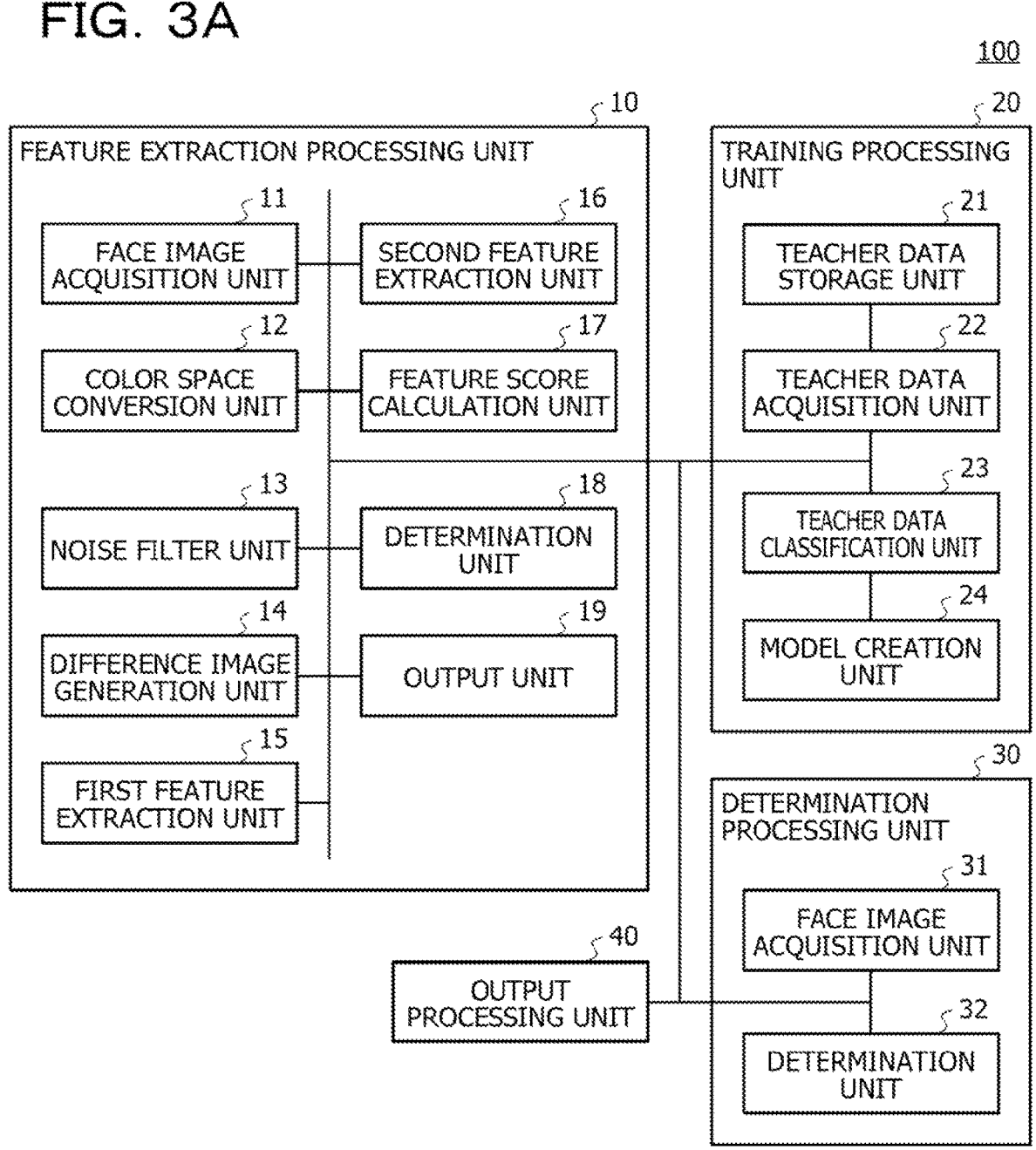
FIG. 3A is a functional block diagram that exemplifies an overall configuration of an information processing device.

FIG. 3A is a block diagram that exemplifies an overall configuration of an information processing device 100. As exemplified in FIG. 3A, the information processing device 100 includes a feature extraction processing unit 10, a training processing unit 20, a determination processing unit 30, and an output processing unit 40. The feature extraction processing unit 10 includes a face image acquisition unit 11, a color space conversion unit 12, a noise filter unit 13, a difference image generation unit 14, a first feature extraction unit 15, a second feature extraction unit 16, a feature score calculation unit 17, a determination unit 18, and an output unit 19. The training processing unit 20 includes a teacher data storage unit 21, a teacher data acquisition unit 22, a teacher data classification unit 23, and a model creation unit 24. The determination processing unit 30 includes a face image acquisition unit 31 and a determination unit 32.

Figure 3B:
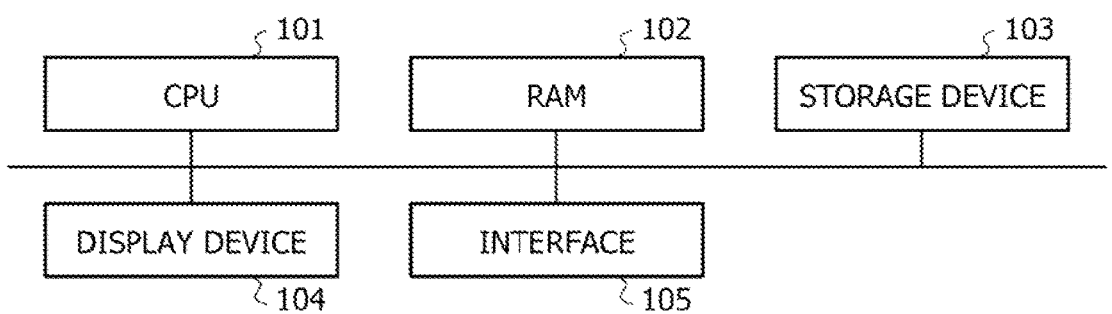
FIG. 3B is a block diagram that exemplifies a hardware configuration of the information processing device.

FIG. 3B is a block diagram that exemplifies a hardware configuration of the feature extraction processing unit 10, the training processing unit 20, the determination processing unit 30, and the output processing unit 40. As exemplified in FIG. 3B, the information processing device 100 includes a CPU 101, a RAM 102, a storage device 103, a display device 104, an interface 105, and the like.

The CPU (Central Processing Unit) 101 is a central processing unit. The CPU 101 includes one or more cores. The RAM (Random Access Memory) 102 is a volatile memory that temporarily stores a program to be executed by the CPU 101, data to be processed by the CPU 101, or the like. The storage device 103 is a nonvolatile storage device. As the storage device 103, for example, a ROM (Read Only Memory), a solid state drive (SSD) such as a flash memory, a hard disk to be driven by a hard disk drive, or the like may be used. The storage device 103 stores the determination program according to the present embodiment. The display device 104 is a display device such as a liquid crystal display. The interface 105 is an interface device with an external device. For example, face image data can be acquired from an external device via the interface 105. The feature extraction processing unit 10, the training processing unit 20, the determination processing unit 30, and the output processing unit 40 of the information processing device 100 are implemented when the CPU 101 executes the determination program. Note that hardware such as a dedicated circuit may be used as the feature extraction processing unit 10, the training processing unit 20, the determination processing unit 30, and the output processing unit 40.

(Feature Extraction Processing)

Figure 4:
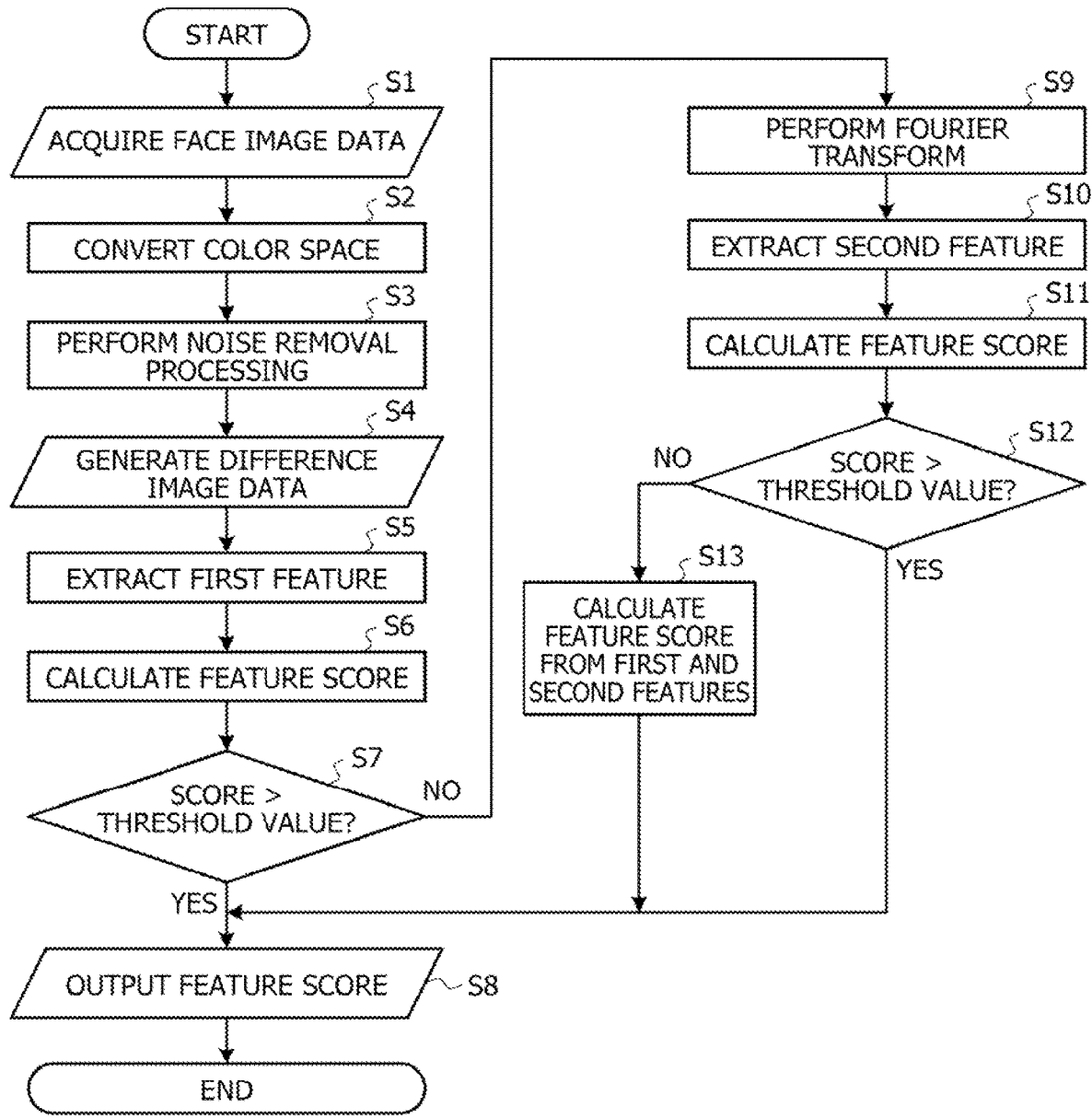
FIG. 4 is a flowchart that exemplifies feature extraction processing.

FIG. 4 is a flowchart that exemplifies feature extraction processing executed by the feature extraction processing unit 10. As exemplified in FIG. 4, the face image acquisition unit 11 acquires face image data (step S1).

Next, the color space conversion unit 12 converts the color space of the face image data acquired in step S1 into a predetermined color space (step S2). For example, the color space conversion unit 12 converts the face image data into an HSV color space including three components of hue (Hue), saturation (Saturation Chroma), and value (Value Brightness). In the HSV color space, luminance or image intensity can be separated from saturation or color information.

Next, the noise filter unit 13 generates face image data from which noise has been removed by performing noise removal processing on the face image data obtained in step S2 (step S3). In step S3, the noise filter unit 13 performs the noise removal processing by using a specific algorithm. For the noise removal processing, a known technique that removes image noise or the like can be used.

Next, the difference image generation unit 14 generates difference image data concerning difference between the face image data obtained in step S2 and the face image obtained in step S3 (step S4). The residual noise that remains in the face image acquired in step S1 can be obtained by generating the difference image data. Note that, when the processing in step S2 is not performed, difference image data concerning difference between the face image data acquired in step S1 and the face image data after the noise removal processing may be generated.

Next, the first feature extraction unit 15 extracts, as a first feature, a feature of signal abnormality caused by the morphing processing from the spatial domain information of the difference image data (step S5). For example, the first feature extraction unit 15 extracts a vector value of spatial domain information such as LBP (Local Binary Pattern) or CoHOG (Co-occurrence Histograms of Oriented Gradients) as a feature of signal abnormality. For example, the first feature extraction unit 15 can extract a vector value in a spatial domain by using a statistic obtained by comparing a pixel value of a pixel of interest with pixel values of pixels around the pixel of interest. Further, the first feature extraction unit 15 may extract a vector value in a spatial domain by using deep learning. The first feature extraction unit 15 may use a feature amount represented by numerical expression.

Next, the feature score calculation unit 17 calculates, as a feature score, a degree of certainty that the face image data acquired in step S1 is morphing image data, from the first feature extracted in step S5 (step S6). For example, the statistic or the like of the vector value obtained in step S5 can be used as the feature score.

Next, the determination unit 18 determines whether or not the feature score calculated in Step S5 exceeds a threshold value (step S7). This threshold value can be determined in advance from, for example, a variation value in a case where the feature score is calculated from the spatial domain for a plurality of pieces of face image data, or the like.

In a case where "Yes" is determined in step S7, the output unit 19 outputs the feature score calculated in step S6 (step S8).

In a case where "No" is determined in step S7, the second feature extraction unit 16 generates frequency information in the frequency domain from the difference image data (step S9). For example, the second feature extraction unit 16 can generate frequency information in the frequency domain by performing digital Fourier transform on the difference image data.

Next, the second feature extraction unit 16 extracts, as a second feature, a feature of signal abnormality caused by the morphing processing from the frequency information generated in step S9 (step S10). For example, the second feature extraction unit 16 extracts, as a feature of signal abnormality, a vector value in a frequency domain such as a gray level co-occurrence matrix (GLCM). For example, the second feature extraction unit 16 can extract a vector value in a frequency domain by using a statistic obtained by comparing a pixel value of a pixel of interest with pixel values of pixels around the pixel of interest. Further, the second feature extraction unit 16 may extract a vector value in a frequency domain by using deep learning. The second feature extraction unit 16 may use a feature amount represented by numerical expression.

Next, the feature score calculation unit 17 calculates, as a feature score, a degree of certainty that the face image data acquired in step S1 is morphing image data, from the frequency feature extracted in step S10 (step S11). For example, the statistic or the like of the vector value obtained in step S10 can be used as the feature score.

Next, the determination unit 18 determines whether or not the feature score calculated in step S11 exceeds a threshold value (step S12). The threshold value in step S12 can be determined in advance from, for example, a variation value in a case where the feature score is calculated from the frequency domain for a plurality of pieces of face image data, or the like.

In a case where "Yes" is determined in step S12, the output processing unit 40 outputs the feature score calculated in step S11 (step S8).

In a case where "No" is determined in step S12, the feature score calculation unit 17 calculates, as a feature score, the degree of certainty that the face image data acquired in step S1 is morphing image data, from the first feature extracted in step S5 and the second feature extracted in step S10 (step S13). Thereafter, the output processing unit 40 outputs the feature score calculated in step S13 (step S8).

(Training Processing)

Figure 5:
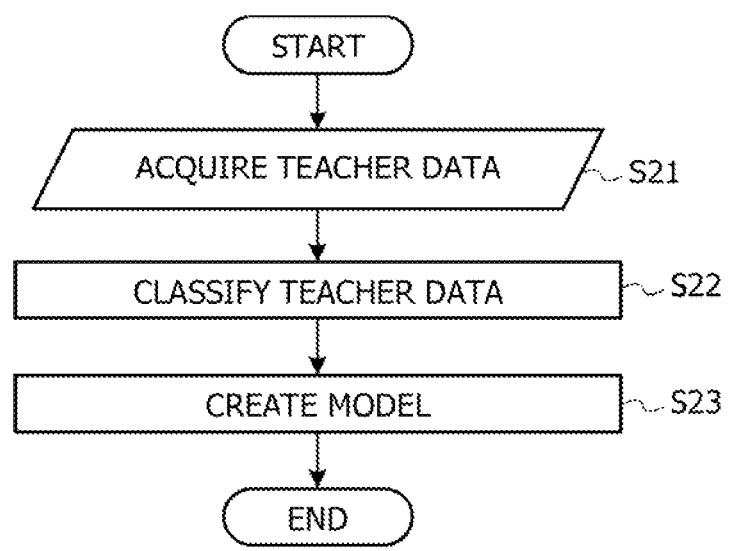
FIG. 5 is a flowchart that exemplifies training processing.

FIG. 5 is a flowchart that exemplifies training processing executed by the training processing unit 20. As exemplified in FIG. 5, the teacher data acquisition unit 22 acquires each piece of teacher data stored in the teacher data storage unit 21 (step S21). The teacher data is teacher data of a face image, and includes actual face image data that is not corrected and morphing image data. As exemplified in FIG. 6, one of an identifier (Bonafide), which indicates actual face image data, and an identifier (Morphing), which indicates a morphing image, is associated with each piece of teacher data. These pieces of teacher data are created in advance by a user or the like and stored in the teacher data storage unit 21. The feature extraction processing in FIG. 4 is executed for each piece of teacher data acquired in step S21.

Next, the teacher data classification unit 23 classifies, for each piece of teacher data, the feature score output by the output unit 19, into the actual face image data and the morphing image data according to the identifier stored in the teacher data storage unit 21 (step S22).

Next, the model creation unit 24 creates a model for evaluation, based on the result of the classification in step S22 (step S23). For example, a model for classification is created by, for example, subtracting the separation hyperplane (boundary plane) from the relationship between the identifier and the space in which the feature score of each piece of teacher data is distributed. Through the above processing, a classification model can be created.

(Determination Processing)

Figure 7:
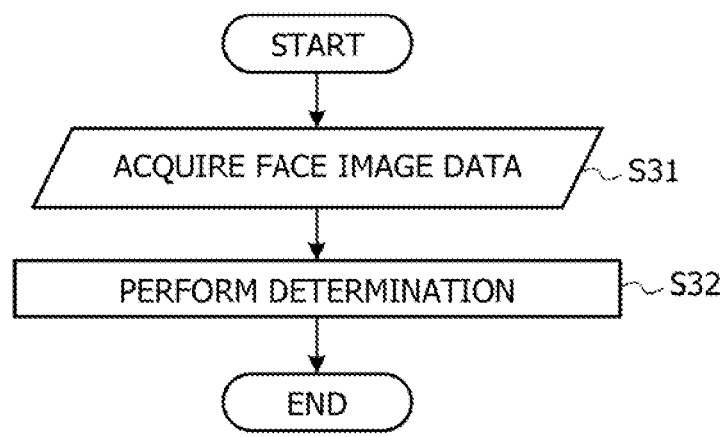
FIG. 7 is a flowchart that exemplifies determination processing.

FIG. 7 is a flowchart that exemplifies determination processing executed by the determination processing unit 30. As exemplified in FIG. 7, the face image acquisition unit 31 acquires face image data (step S31). The feature extraction processing in FIG. 4 is performed on the face image data acquired in step S31. Since the face image data is, for example, face image data for creation of a passport, the face image data is input from an external device through the interface 105.

Next, the determination unit 32 determines whether or not the feature score output by the output unit 19 is an actual image or a morphing image based on the model for classification created by the model creation unit 24 (step S32). A determination result of step S32 is output by the output processing unit 40. The determination result output by the output processing unit 40 is displayed on the display device 104.

According to the present embodiment, first, whether or not face image data is a morphing image is determined by using spatial domain information of residual noise. By using the spatial domain information of the residual noise, a discontinuous point of the noise intensity and the like can be easily detected. In a case where the face image data is not determined to be a morphing image by a determination that uses the spatial domain information, whether or not the face image data is a morphing image is redetermined by using frequency domain information. By using the frequency domain information, determination accuracy is improved. In addition, since it is not needed to use a special image sensor or the like, the cost can be reduced. In addition, in a case where face image data is not determined to be a morphing image by a determination that uses the spatial domain information, redetermination is performed by using frequency domain information. Therefore, the processing time can be shortened as compared with a case where determination is always performed by using the spatial domain information and the frequency domain information.

In the example described above, the noise filter unit 13 is an example of a face image data generation unit that generates face image data in which noise is removed by a specific algorithm from the face image data in a case where the face image data is acquired. The difference image generation unit 14 is an example of a difference image data generation unit that generates difference image data concerning difference between the face image data that has been acquired, and the face image data that has been generated. The determination unit 18 is an example of a first determination unit that determines whether or not the face image data that has been acquired is a composite image based on information included in the difference image data. The determination unit 18 is an example of a second determination unit that determines whether or not the face image data that has been acquired is a composite image based on information included in the frequency data. The determination processing unit 30 is an example of a determination processing unit that further determines whether or not the face image data, which has been determined whether or not the face image data is the composite image, is a composite image using a classification model machine-learned (i.e., trained) by using teacher data of a plurality of pieces of face image data. The second feature extraction unit 16 is an example of a frequency data generation unit that generates the frequency data from the difference image data by digital Fourier transform.

While the embodiment of the present invention has been described above in detail, the present invention is not limited to such a specific embodiment, and various modifications and alterations may be made within the scope of the gist of the present invention described in the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A determination method implemented by a computer, the determination method comprising:
   generating face image data from which noise is removed by a specific algorithm from face image data when the face image data is acquired;
   generating difference image data concerning difference between the face image data that has been acquired and the face image data that has been generated;
   determining whether the face image data that has been acquired is a composite image based on information included in the difference image data; and
   determining whether the face image data that has been acquired is a composite image based on information included in frequency data generated from the difference image data in a case where the face image data that has been acquired is not determined to be a composite image.

2. The determination method according to claim 1, wherein the determining of whether the face image data that has been acquired is a composite image includes detecting a discontinuous portion of noise intensity.

3. The determination method according to claim 1, the method further comprising: determining, using a classification model trained by using teacher data of a plurality of pieces of face image data, whether the face image data that has been determined whether or not the face image data is the composite image is a composite image.

4. The determination method according to claim 1, wherein a color space of the face image data that has been acquired is an HSV color space.

5. The determination method according to claim 1, the method further comprising: generating the frequency data from the difference image data by digital Fourier transform.

6. The determination method according to claim 1, wherein the information included in the difference image data is a statistic obtained by comparing a pixel value of a pixel of interest with pixel values of pixels around the pixel of interest.

7. The determination method according to claim 1, wherein a feature amount represented by numerical expression is used as the information included in the difference image data.

8. A non-transitory computer-readable recording medium storing a determination program for causing a computer to perform processing, the processing comprising:
generating face image data from which noise is removed by a specific algorithm from face image data when the face image data is acquired;
generating difference image data concerning difference between the face image data that has been acquired and the face image data that has been generated;
determining whether the face image data that has been acquired is a composite image based on information included in the difference image data; and
determining whether the face image data that has been acquired is a composite image based on information included in frequency data generated from the difference image data in a case where the face image data that has been acquired is not determined to be a composite image.

9. The non-transitory computer-readable recording medium according to claim 8, wherein the determining of whether the face image data that has been acquired is a composite image includes detecting a discontinuous portion of noise intensity.

10. The non-transitory computer-readable recording medium according to claim 8, the processing further comprising: determining, using a classification model trained by using teacher data of a plurality of pieces of face image data, whether the face image data that has been determined whether or not the face image data is the composite image is a composite image.

11. The non-transitory computer-readable recording medium according to claim 8, wherein a color space of the face image data that has been acquired is an HSV color space.

12. The non-transitory computer-readable recording medium according to claim 8, the processing further comprising: generating the frequency data from the difference image data by digital Fourier transform.

13. The non-transitory computer-readable recording medium according to claim 8, wherein the information included in the difference image data is a statistic obtained by comparing a pixel value of a pixel of interest with pixel values of pixels around the pixel of interest.

14. The non-transitory computer-readable recording medium according to claim 8, wherein a feature amount represented by numerical expression is used as the information included in the difference image data.

15. An information processing device comprising:
memory; and
processor circuitry coupled to the memory, the processor circuitry being configured to perform processing including:
generating face image data from which noise is removed by a specific algorithm from face image data when the face image data is acquired;
generating difference image data concerning difference between the face image data that has been acquired and the face image data that has been generated;
determining whether the face image data that has been acquired is a composite image based on information included in the difference image data; and
determining whether the face image data that has been acquired is a composite image based on information included in frequency data generated from the difference image data in a case where the face image data that has been acquired is not determined to be a composite image.

16. The information processing device according to claim 15, wherein
the determining of whether the face image data that has been acquired is a composite image includes detecting a discontinuous portion of noise intensity.

17. The information processing device according to claim 15, the processing further comprising: determining, using a classification model trained by using teacher data of a plurality of pieces of face image data, whether the face image data that has been determined whether or not the face image data is the composite image is a composite image.

18. The information processing device according to claim 15, wherein a color space of the face image data that has been acquired is an HSV color space.

19. The information processing device according to claim 15, the processing further comprising: generating the frequency data from the difference image data by digital Fourier transform.

20. The information processing device according to claim 15, wherein the information included in the difference image data is a statistic obtained by comparing a pixel value of a pixel of interest with pixel values of pixels around the pixel of interest.

21. The information processing device according to claim 15, wherein a feature amount represented by numerical expression is used as the information included in the difference image data.

* * * * *